United States Patent
Yoneda

(10) Patent No.: US 11,521,346 B2
(45) Date of Patent: Dec. 6, 2022

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Keigo Yoneda, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/382,473

(22) Filed: Jul. 22, 2021

(65) Prior Publication Data

US 2022/0051469 A1    Feb. 17, 2022

(30) Foreign Application Priority Data

Aug. 12, 2020  (JP) .............................. JP2020-136320

(51) Int. Cl.
*G06T 15/20* (2011.01)
(52) U.S. Cl.
CPC ................................... *G06T 15/20* (2013.01)
(58) Field of Classification Search
None
See application file for complete search history.

(56) References Cited

U.S. PATENT DOCUMENTS

| | | | |
|---|---|---|---|
| 10,916,048 B2 | 2/2021 | Yoneda | |
| 2014/0278847 A1* | 9/2014 | Gallo | G06Q 30/0252 705/14.5 |
| 2019/0206141 A1* | 7/2019 | Deng | G06V 40/172 |
| 2020/0099906 A1* | 3/2020 | Sugisawa | G06V 10/145 |
| 2020/0145635 A1 | 5/2020 | Yoneda | |
| 2020/0368619 A1* | 11/2020 | Yeung | G06F 3/011 |
| 2020/0404221 A1* | 12/2020 | Trundle | H04N 7/18 |
| 2021/0076105 A1* | 3/2021 | Parmar | G06F 3/048 |
| 2021/0120224 A1 | 4/2021 | Yoneda | |
| 2021/0233326 A1* | 7/2021 | Li | G06T 7/74 |
| 2021/0358204 A1 | 11/2021 | Yoneda | |

FOREIGN PATENT DOCUMENTS

| | | |
|---|---|---|
| JP | 2014-216667 A | 11/2014 |
| JP | 2018-085571 A | 5/2018 |
| JP | 2019-016862 A | 1/2019 |

* cited by examiner

*Primary Examiner* — Frank S Chen

(74) *Attorney, Agent, or Firm* — Carter, DeLuca & Farrell LLP

(57) ABSTRACT

An image processing apparatus obtains virtual viewpoint information indicating at least a position of a virtual viewpoint and a view direction from the virtual viewpoint and generates a virtual viewpoint image based on the virtual viewpoint information and a plurality of images captured from a plurality of viewpoints by hiding processing a specific region of the virtual viewpoint image, the specific region being determined based on that the obtained virtual viewpoint information satisfies a condition.

14 Claims, 10 Drawing Sheets

IMAGE PROCESSING APPARATUS, IMAGE PROCESSING METHOD, AND STORAGE MEDIUM

FIELD

The present disclosure relates to a technique to generate a virtual viewpoint image.

DESCRIPTION OF THE RELATED ART

There is a virtual viewpoint image generation technique as a technique to reproduce a moving image from a viewpoint virtually located in a three-dimensional space (virtual viewpoint) using images captured by a plurality of actual cameras. For example, a user can use a touch panel display of a tablet to operate the virtual viewpoint to obtain a desired virtual viewpoint image while displaying a virtual viewpoint image on a UI screen. A user can enjoy a realistic virtual viewpoint image by directly operating the virtual viewpoint.

On the other hand, a user can also operate the virtual viewpoint to run counter to the intent of a content distributor. For example, in a case where a content is a soccer game, a user can operate the virtual viewpoint to monitor a spectator instead of a player. Thus, protection of spectators' privacy needs to be enhanced.

Japanese Patent Laid-Open No. 2014-216667 (hereinafter referred to as PTL 1) discloses a technique to switch between display and non-display of a subject by stopping invisible-making processing which makes the subject invisible upon detection of predetermined operation of the subject.

In PTL 1, however, the display and non-display of a subject cannot be switched according to operation by a user who is watching an image. There is a possibility that an inappropriate virtual viewpoint image is generated.

SUMMARY

An image processing apparatus according to an aspect of the present disclosure obtains virtual viewpoint information indicating at least a position of a virtual viewpoint and a view direction from the virtual viewpoint and generates a virtual viewpoint image based on the virtual viewpoint information and a plurality of images captured from a plurality of viewpoints by hiding processing a specific region of the virtual viewpoint image, the specific region being determined based on that the obtained virtual viewpoint information satisfies a condition.

Further features of the present disclosure will become apparent from the following description of exemplary embodiments with reference to the attached drawings.

DESCRIPTION OF THE EMBODIMENTS

Figure 1A:
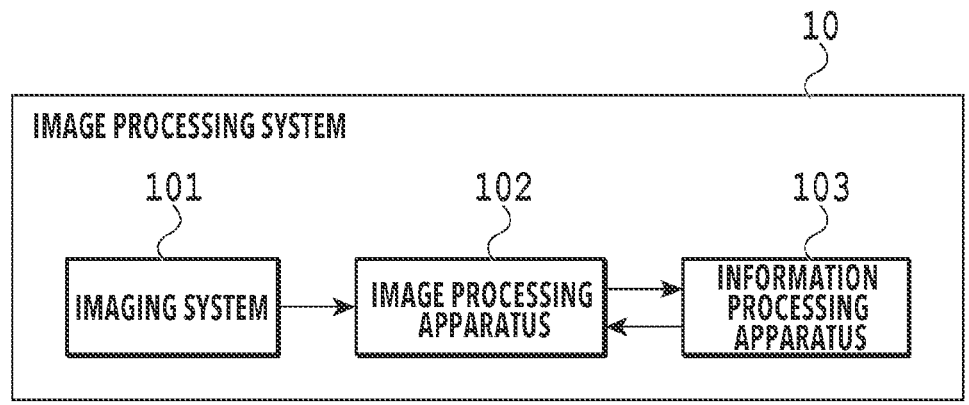
FIG. 1A and FIG. 1B are diagrams showing a system configuration and blocks of an image processing apparatus.

Preferred embodiments of the present disclosure will be hereinafter described in detail with reference to the accompanying drawings. It should be noted that the embodiments described below do not limit the present disclosure and that not all combinations of features described in the embodiments are necessarily essential for solving the problem to be solved by the present disclosure.

First Embodiment

In the present embodiment, a description will be given of an example in which a region to be subjected to hiding processing is determined based on virtual viewpoint information, which is a parameter (information) indicating a virtual viewpoint. It should be noted that a virtual camera may be treated as if it is placed in a virtual space and that the virtual viewpoint may be expressed as a viewpoint from the virtual camera. The virtual viewpoint information is information indicating at least the position of a virtual viewpoint and a line-of-sight direction (a view direction) from the virtual viewpoint. The virtual viewpoint information includes the moving direction, orientation (attitude), rotation, moving distance, moving speed or the like of the virtual viewpoint. These parameters are designated by user operation and the virtual viewpoint is set according to the designated parameters.

In the present embodiment, processing of displaying a privacy mask is performed as the hiding processing. The display of a privacy mask means obscuring the display of a subject such as a person (hereinafter also referred to as an object) in a virtual viewpoint image in order to protect the object's privacy. The privacy mask will be described later in detail.

As mentioned above, a user can watch a virtual viewpoint image seen from an arbitrary viewpoint by user operation. In this case, for example, protection of spectators' privacy needs to be enhanced. For this purpose, it is considered that a privacy mask is always displayed on spectators in a virtual viewpoint image. In this case, although spectators' privacy is protected, the realism of the virtual viewpoint image is reduced. For example, a moving image showing spectators at a goal scene can report excitement at a stadium to a user and increase the realism. At a goal scene, the realism is reduced if the image is displayed with a privacy mask on spectators in the seats. Thus, in the present embodiment, the privacy mask is displayed in a case where a user operates the virtual viewpoint such that the privacy of the subject (object) cannot be appropriately protected, while the privacy mask is not displayed in other cases. For example, in a case where a user operates the virtual viewpoint to gaze at a player, the privacy mask is not displayed even if the image shows a spectator. In contrast, in a case where a user operates the virtual viewpoint to gaze at a spectator, the privacy mask is displayed. A description will be hereinafter given of processing of automatically determining switching between display and non-display of the privacy mask based on the parameter indicating the virtual viewpoint.

Hardware Configuration of Image Processing System

Figure 1B:
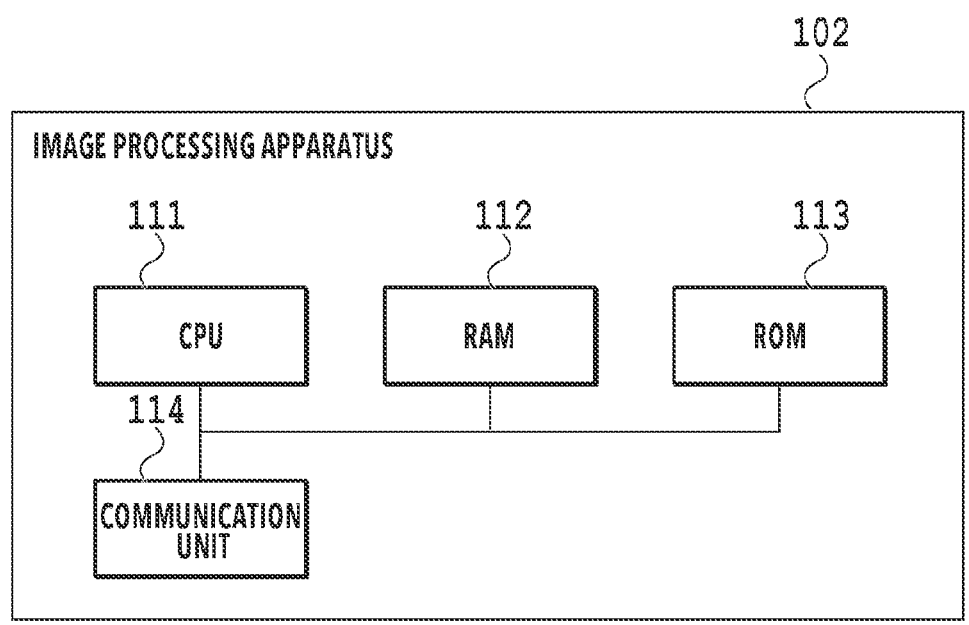

FIG. 1A and FIG. 1B are diagrams showing a system configuration and blocks of an image processing apparatus according to the present embodiment. FIG. 1A is a diagram showing an example of an entire configuration of an image processing system 10 according to the present embodiment. A virtual viewpoint image means an image generated by a user, an elected operator, or the like freely operating the position and attitude of the virtual viewpoint and is also referred to as a free viewpoint image or an arbitrary viewpoint image. It should be noted that the word "image" encompasses both of a moving image and a still image unless otherwise specified. That is, the image processing system 10 can process both of a still image and a moving image.

The image processing system 10 includes an imaging system 101, and image processing apparatus 102, and an information processing apparatus 103. The imaging system 101 and the image processing apparatus 102 are configured to communicate with each other via a network or the like. The image processing apparatus 102 and the information processing apparatus 103 are also configured to communicate with each other via a network or the like. The image processing system 10 can generate a virtual viewpoint image.

The imaging system 101 includes a plurality of cameras (image capturing apparatuses) arranged at different positions and synchronously captures images (a plurality of images) from a plurality of viewpoints. The imaging system 101 transmits the images synchronously captured from the viewpoints to the image processing apparatus 102.

The image processing apparatus 102 generates a virtual viewpoint image seen from a virtual viewpoint based on the images synchronously captured from the viewpoints. The image processing apparatus 102 can generate an image seen from a viewpoint different from any of the cameras of the imaging system 101, that is, a virtual viewpoint image. The virtual viewpoint is set by virtual viewpoint information (parameter) determined based on the amounts of operation of the virtual viewpoint (virtual camera) received from the external information processing apparatus 103 to be described later. The image processing apparatus 102 sequentially generates a virtual viewpoint image from the received images.

The information processing apparatus 103 comprises a controller for controlling the virtual viewpoint and a display unit which displays the state of the virtual viewpoint and the like. The controller includes a joystick, a knob, a jog dial or the like for operating the virtual viewpoint in addition to a general input device for user input operation such as a keyboard or a mouse. The display unit is at least one display device (hereinafter referred to as "monitor") for displaying information necessary for a user. For example, in a case where a touch panel display is used as the display device, the touch panel can also function as the controller described above. The monitor displays a virtual viewpoint image or a UI screen for virtual viewpoint control. A user designates the amounts of operation of the virtual viewpoint, that is, a moving direction, orientation (attitude), rotation, moving distance, moving speed and the like, while watching the monitor, and transmits them to the image processing apparatus 102 via the information processing apparatus 103. The information processing apparatus 103 receives the virtual viewpoint image generated by the image processing apparatus 102 and displays it on the monitor.

FIG. 1B is a diagram showing an example of a hardware configuration of the image processing apparatus 102. The image processing apparatus 102 includes a CPU 111, a RAM 112, a ROM 113, and a communication unit 114.

The CPU 111 is a processor which executes a program stored in the ROM 113 using the RAM 112 as a work memory to exercise control over the components of the image processing apparatus 102. The CPU 111 executes various programs, thereby realizing the function of each processing unit shown in FIG. 3 to be described later. Alternatively, the image processing apparatus 102 may have one or more types of dedicated hardware different from the CPU 111 and at least part of the processing by the CPU 111 may be performed by the dedicated hardware. Examples of the dedicated hardware include an application-specific integrated circuit (ASIC), a field-programmable gate array (FPGA), and a digital signal processor (DSP).

The RAM 112 temporarily stores a computer program read from the ROM 113, a running total of calculations, and the like. The ROM 113 stores computer programs or data which do not require change. The communication unit 114 comprises communication means such as Ethernet or USB to communicate with the imaging system 101 and the information processing apparatus 103.

Figure 2:
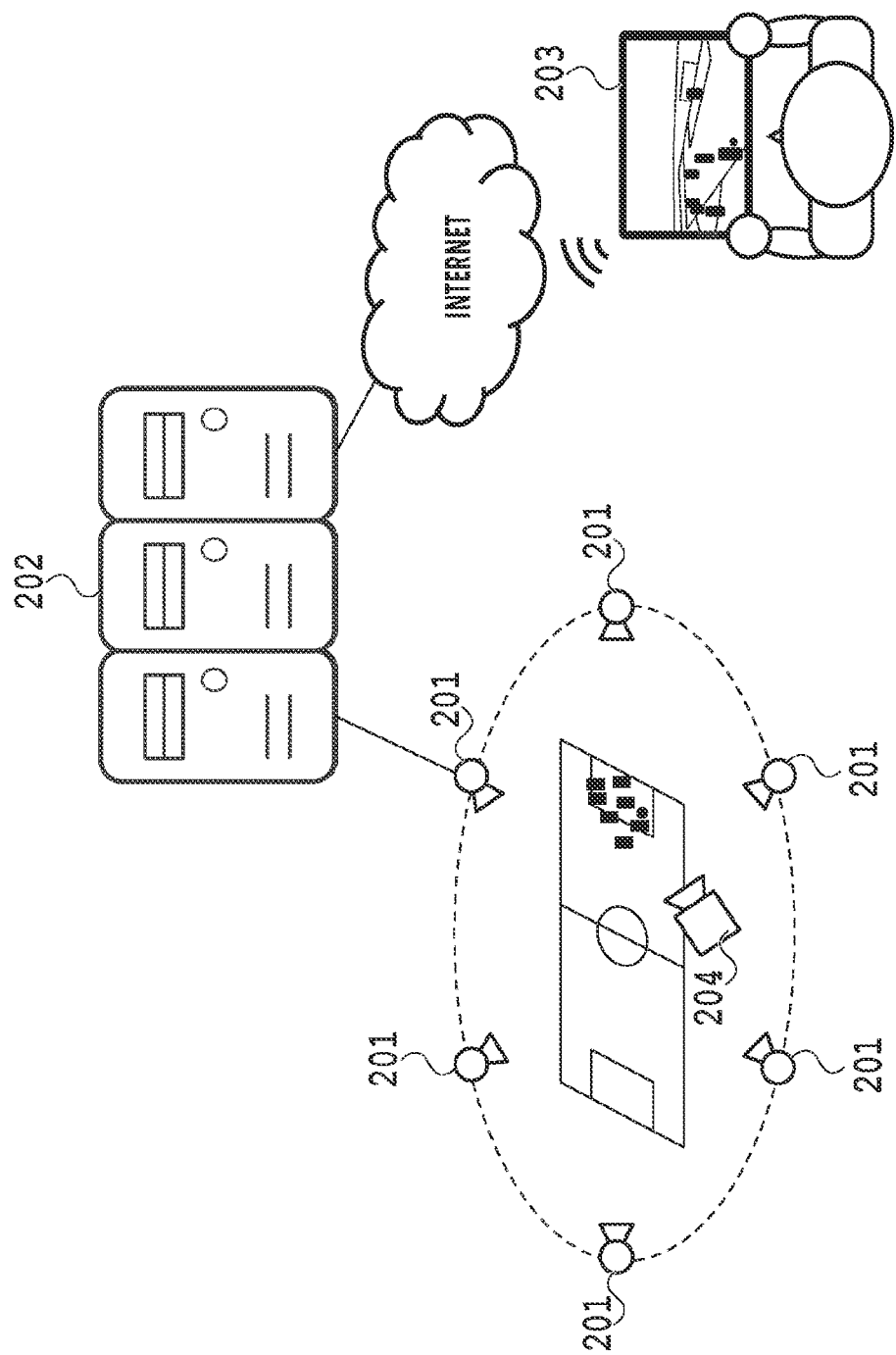
FIG. 2 is a diagram illustrating an example of an image processing system.

FIG. 2 is a diagram showing an example of the image processing system 10. A camera group 201, an image processing server 202, and a tablet 203 in FIG. 2 correspond to the imaging system 101, the image processing apparatus 102, and the information processing apparatus 103, respectively. The camera group 201 includes a plurality of cameras which capture images of an object from different directions. The captured images captured by the respective cameras are transmitted to the image processing server 202.

The image processing server 202 determines a parameter indicating the virtual viewpoint from the amounts of operation of the virtual viewpoint received from the tablet 203 to be described later and applies processing such as rendering to the received captured images based on the parameter, thereby generating a virtual viewpoint image. At the time of generation of a virtual viewpoint image, the image processing server 202 determines whether to display a privacy mask in the virtual viewpoint image based on the parameter indicating the virtual viewpoint. That is, the image processing server 202 determines that a region in which the parameter indicating the virtual viewpoint satisfies a predetermined condition is a hidden region (specific region) for which hiding processing is performed in the virtual viewpoint image. In the case of displaying the privacy mask (in the case of performing the hiding processing), masking processing is performed for a part of the virtual viewpoint image. The image processing server 202 then transmits the generated virtual viewpoint image to the tablet 203 of a user on the Internet.

The tablet 203 transmits the amounts of operation of the virtual viewpoint 204 to the image processing server 202 in response to user operation of the virtual viewpoint 204 on the UI screen using the touch panel of the tablet 203. The tablet 203 also displays the virtual viewpoint image received from the image processing server 202 on the UI screen. The UI screen allows a user to operate the virtual viewpoint 204 using the touch panel while watching the virtual viewpoint image displayed on the tablet 203 and enjoy the virtual viewpoint image generated based on an arbitrary viewpoint. Although the tablet 203 displays the virtual viewpoint image received from the image processing server 202 on the monitor in the present embodiment, the tablet 203 is not limited to this example. The tablet 203 may receive data for generating the virtual viewpoint image from the image processing server 202 such that the tablet 203 generates the virtual viewpoint image and displays the privacy mask. In other words, the information processing apparatus 103 may perform some of the functions of the image processing apparatus 102. Further, although the tablet 203 transmits the amounts of operation of the virtual viewpoint by a user to the image processing server 202 in the present embodiment, the tablet 203 may determine a parameter indicating the virtual viewpoint based on the amounts of operation and then transmit the parameter to the image processing server 202. In this case, the image processing server 202 generates the virtual viewpoint image based on the received parameter indicating the virtual viewpoint. Further, although an example of using the tablet 203 as the information processing apparatus 103 is mainly described in the present embodiment, the information processing apparatus 103 is not limited to this and may be, for example, a computer having a controller which controls the virtual viewpoint or a monitor which displays the virtual viewpoint image.

Software Configuration of Image Processing Apparatus

Figure 3:
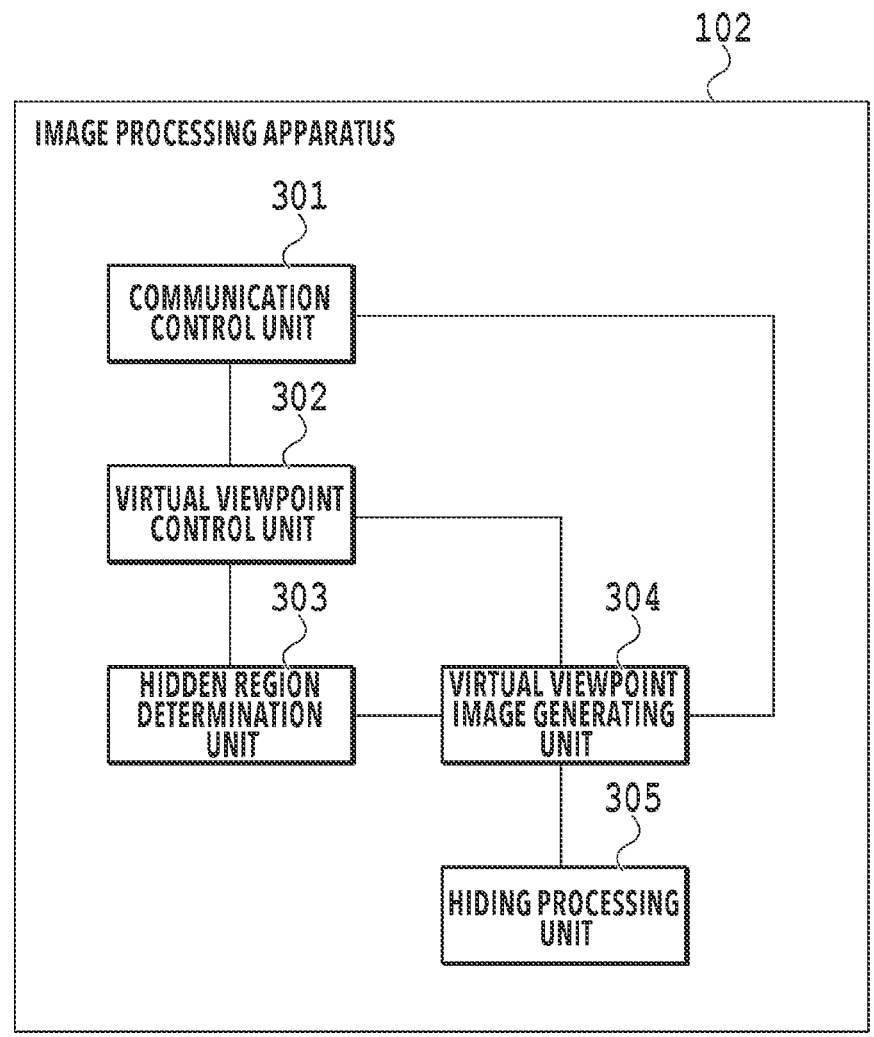
FIG. 3 is a diagram showing an example of a functional configuration of the image processing apparatus.

FIG. 3 is a diagram showing an example of a functional configuration concerning processing of switching between display and non-display of the privacy mask using the parameter indicating the virtual viewpoint in the image processing apparatus 102. The image processing apparatus 102 comprises a communication control unit 301, a virtual viewpoint control unit 302, a hidden region determination unit 303, a virtual viewpoint image generating unit 304, and a hiding processing unit 305.

The communication control unit 301 uses the communication unit 114 to receive information such as image data obtained by the cameras of the imaging system 101 capturing images of an object from different directions and the amounts of operation of the virtual viewpoint from the information processing apparatus 103. The received data or the like is output to the virtual viewpoint control unit 302 and the virtual viewpoint image generating unit 304. The communication control unit 301 also receives image data on the virtual viewpoint image from the virtual viewpoint image generating unit 304 and transmits the received image data on the virtual viewpoint image to the information processing apparatus 103.

The virtual viewpoint control unit 302 determines a parameter indicating the virtual viewpoint from the amounts of operation of the virtual viewpoint output from the communication control unit 301. The parameter indicating the virtual viewpoint may include a parameter for designating at least one of a position, attitude, and zoom. The position of the virtual viewpoint designated by the parameter indicating the virtual viewpoint may be represented by three-dimensional coordinates. The position designated by the parameter may be represented by coordinates in a rectangular coordinate system of three axes: X, Y, and Z axes. The origin point may be any position in the three-dimensional space. Further, the attitude of the virtual viewpoint designated by the parameter indicating the virtual viewpoint may be represented by angles formed with three axes: pan, tilt, and roll. The zoom of the virtual viewpoint designated by the parameter indicating the virtual viewpoint is represented by, for example, a single axis of a focal length. The virtual viewpoint control unit 302 can control these parameters. The parameter indicating the virtual viewpoint may include a parameter specifying a different element and does not necessarily need to include all of the parameters stated above. The virtual viewpoint control unit 302 outputs the determined parameter indicating the virtual viewpoint (parameter group) to the hidden region determination unit 303 and the virtual viewpoint image generating unit 304. Upon input of the parameter, the hidden region determination unit 303 determines a region to be subjected to hiding processing from the input parameter and the virtual viewpoint image generating unit 304 generates a virtual viewpoint image at the input parameter.

The hidden region determination unit 303 determines whether or not to display the privacy mask based on the parameter indicating the virtual viewpoint output from the virtual viewpoint control unit 302. For example, the hidden region determination unit 303 determines a region in which the privacy mask is displayed. In the case of displaying the privacy mask, the hidden region determination unit 303 outputs a region to be subjected to masking processing in a virtual viewpoint image to the virtual viewpoint image generating unit 304. The method of determining display/non-display of the privacy mask will be described later using a specific example. The hidden region determination unit 303 may obtain, from the ROM 113, a parameter for a determination condition of the masking processing prestored in the ROM 113 such as a threshold Th in FIG. 8 to be described later. The hidden region determination unit 303 may obtain, from the virtual viewpoint image generating unit 304, data necessary for determining display/non-display of the privacy mask such as position information on an object or a virtual viewpoint image. The shape of a mask region in which the privacy mask is displayed may be a rectangle, polygon, or an arbitrary shape according to an object. Further, the determination of display/non-display of the privacy mask may be synchronized with a determination result of a face detection algorithm, a subject detection algorithm, or a motion detection algorithm.

The virtual viewpoint image generating unit 304 generates a virtual viewpoint image based on the parameter indicating the virtual viewpoint. The virtual viewpoint image is generated based on the parameter indicating the virtual viewpoint input from the virtual viewpoint control unit 302 and a plurality of captured images of an object input from the communication control unit 301. For example, the virtual viewpoint image is generated by coloring a three-dimensional model (3D model) of an object indicating the three-dimensional shape of the object and a 3D model of background prestored in the ROM 113 and obtained therefrom. The object is, for example, a person or a moving subject present in an image capturing range of the camera group 201. The object is also referred to as foreground in contrast with background. Incidentally, the method of generating the virtual viewpoint image is not limited to this. The virtual viewpoint image generating unit 304 may transmit the generated 3D model of the object, position information thereof, the generated virtual viewpoint image, and the like to the hidden region determination unit 303.

The virtual viewpoint image generating unit 304 also instructs the hiding processing unit 305 to display the privacy mask in the mask region input from the hidden region determination unit 303. For example, the virtual viewpoint image generating unit 304 outputs the generated virtual viewpoint image and the input mask region to the hiding processing unit 305. Mask processing is performed for the mask region by the hiding processing unit 305. At the time of generation of the virtual viewpoint image, the mask region may be colored or not colored by the virtual viewpoint image generating unit 304. In a case where the mask region is not colored, for example, if the virtual viewpoint image is filled in black in the initial state, the mask region is also filled in (masked with) black, that is, the privacy mask is displayed. In this case, it is not necessary for the hiding processing unit 305 to display the privacy mask. In short, the hiding processing may be performed by the virtual viewpoint image generating unit 304 depending on the content of the hiding processing.

The virtual viewpoint image generating unit 304 may also transmit the parameter indicating the virtual viewpoint input from the virtual viewpoint control unit 302 to the hiding processing unit 305. The virtual viewpoint image generating unit 304 transmits the generated virtual viewpoint image (in a case where the hiding processing is performed by the hiding processing unit 305, an image after the hiding processing) to the communication control unit 301.

The hiding processing unit 305 performs processing of displaying the privacy mask in the mask region input from the virtual viewpoint image generating unit 304, that is, masking processing. The masking processing may be processing of filling the mask region in black or another color to form the original image into an obscure image. Alternatively, the masking processing may be processing of obscuring the original image per se such as mosaic processing or processing of pasting an image different from the original image to obscure the original image.

Figure 4:
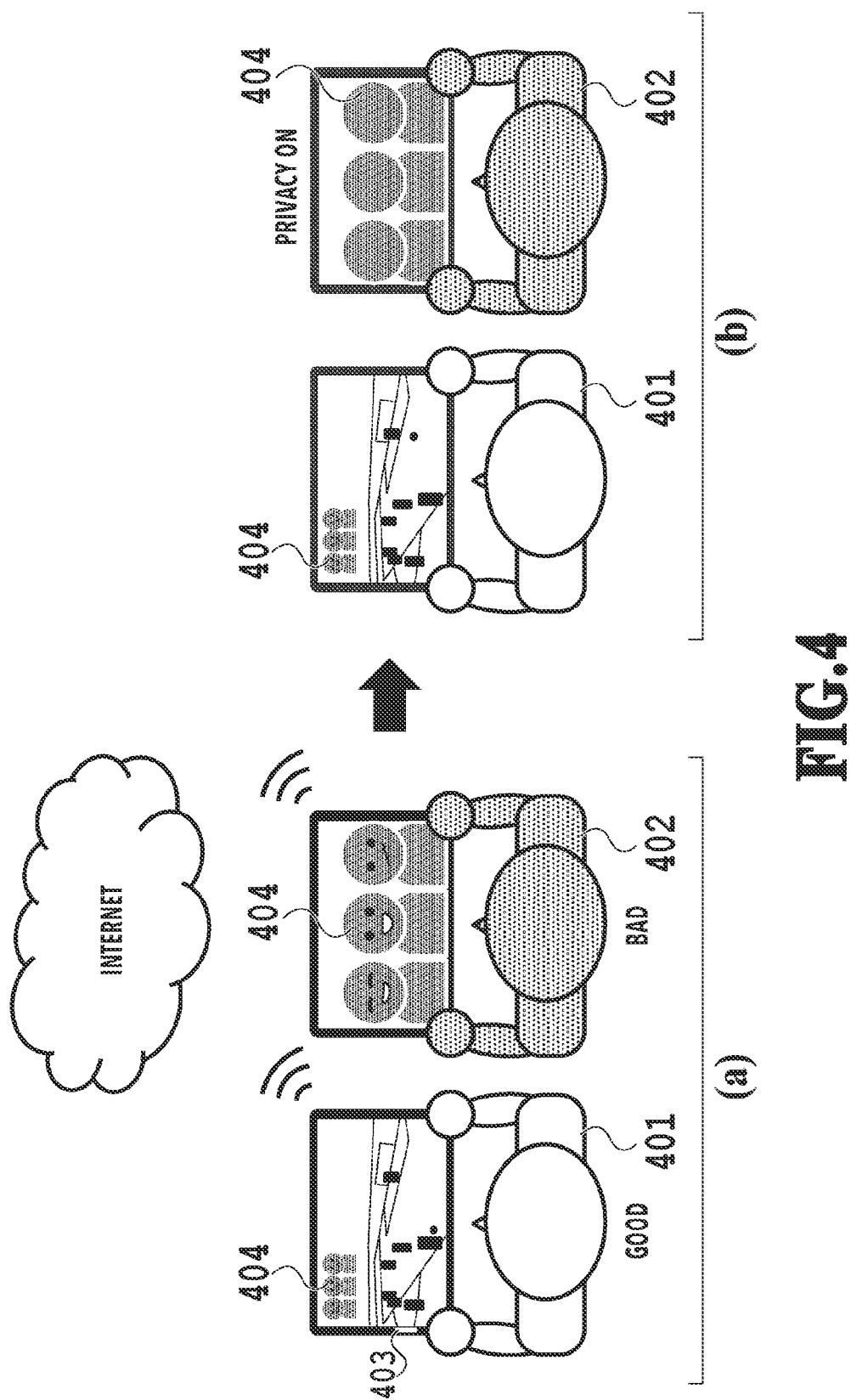
FIG. 4 is a diagram showing an example of switching between display and non-display of a privacy mask.

FIG. 4 is a diagram showing an example of switching between display and non-display of the privacy mask according to the state of the virtual viewpoint. The method of determining display/non-display of the privacy mask will be described below using a specific example. FIG. 4 shows an application example in a case where a user watches a virtual viewpoint image of a soccer game using a tablet.

In FIG. 4 (*a*), a user 401 and a user 402 both watch a virtual viewpoint image displayed on a tablet and operate a touch panel to instruct the moving direction, amount of movement, and the like of the virtual viewpoint. In FIG. 4 (*a*), the user 401 gazes at a player 403 playing soccer on the field, whereas the user 402 gazes at spectators 404 watching soccer in the seats. Although the tablet of the user 401 also displays the same spectators 404, the user 401 gazes at the player 403 on the field and accordingly the displayed spectators 404 are extremely smaller than those displayed on the tablet of the user 402. That is, even though the spectators 404 are displayed on both of the tablets of the user 401 and the user 402, the privacy mask is expected to be displayed only in the virtual viewpoint image displayed on the tablet of the user 402 who gazes at the spectators. Thus, the image processing apparatus 102 determines whether a user gazes at spectators based on the parameter indicating the virtual viewpoint. In the example of FIG. 4 (*a*), it is determined that the tablet of the user 402 gazes at the spectators. As a result, as shown in FIG. 4 (*b*), processing is performed to display the privacy mask only for the spectators 404 displayed on the tablet of the user 402. The image processing apparatus 102 stops displaying the privacy mask in the case of determining that the user 402 stops gazing at the spectators based on the parameter indicating the virtual viewpoint.

The above processing enables switching between display and non-display of the privacy mask. Accordingly, a decrease in realism of the virtual viewpoint image can be suppressed as compared with the case of always displaying the privacy mask on spectators seen in the virtual viewpoint image. Although spectators are shown as an example of an object (subject) to which the privacy mask is applied in the present embodiment, the object is not limited to spectators. Staff or reserve players may also be targets of privacy protection. In addition, even in the case of the player 403, the privacy mask may also be displayed on the player 403 if the way of gazing is different from that generally assumed.

Description of Method of Determining Display/Non-Display of Privacy Mask

Next, a description will be given of two examples of the method of switching between display and non-display of the privacy mask based on the parameter indicating the virtual viewpoint in a case where a user gazes at spectators in the present embodiment. It should be noted that the method of switching is not limited to the two methods described below.

Figure 5:
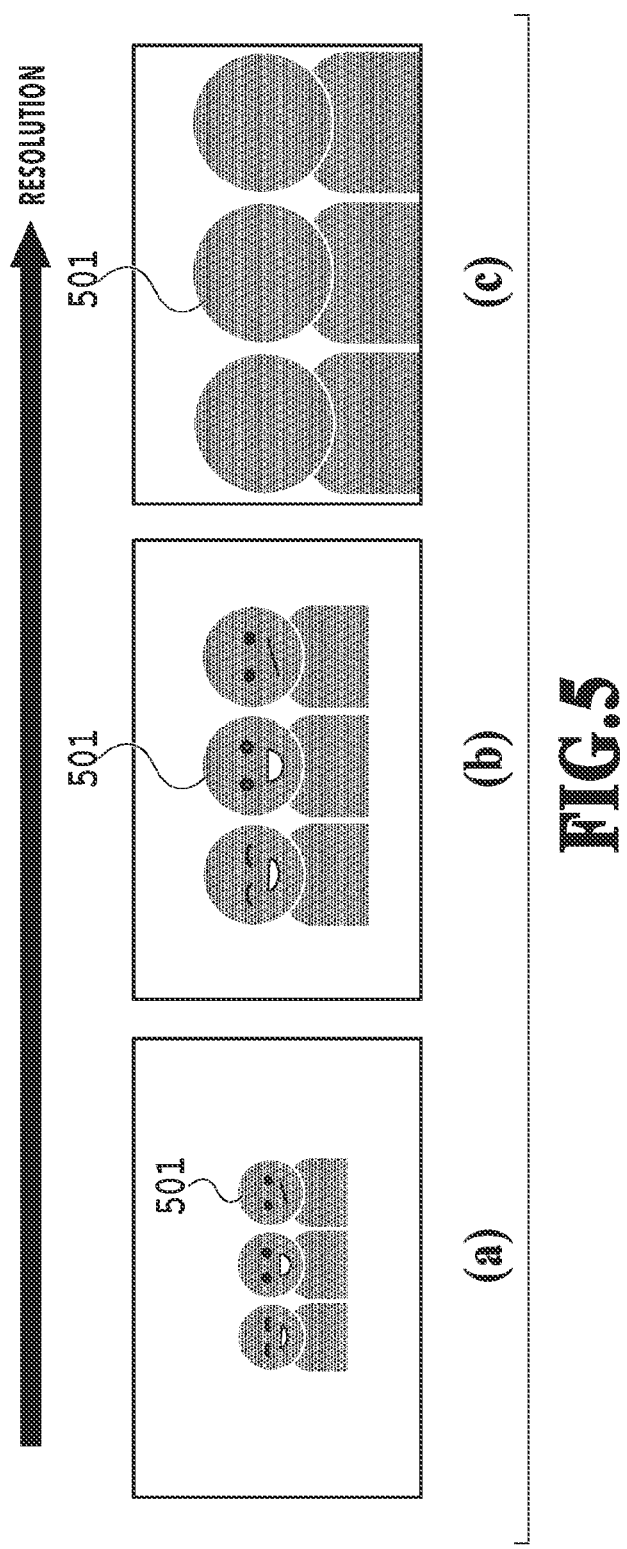
FIG. 5 is a diagram illustrating a method of switching between display and non-display of the privacy mask.

FIG. 5 is a diagram illustrating a first method. The first method is a method of switching between display and non-display of the privacy mask according to the resolution of an object. FIG. 5 is hereinafter used to describe the method of switching between display and non-display of the privacy mask according to the resolution of spectators (size of spectators) seen from the virtual viewpoint. FIG. 5 is a conceptual drawing of the same spectators 501 seen from the virtual viewpoint at different resolutions. The resolution of the spectators 501 increases as the virtual viewpoint becomes close to the spectators 501 from (a) to (b) in FIG. 5. However, in a case where the resolution of the spectators 501 becomes equal to or greater than a certain value, that is, a predetermined threshold, the privacy mask is displayed as shown in FIG. 5 (*c*) such that the facial expressions of the spectators 501 cannot be identified. The resolution is calculated by obtaining a distance from the virtual viewpoint to the spectators 501 based on the position of the spectators 501 and then obtaining the size of spectators per pixel from the relationship between the obtained distance and the focal length of the virtual viewpoint. Incidentally, a player and a spectator can be distinguished based on the position of an object. If an object is positioned on the field, the object is determined to be a player. If an object is positioned outside the field, the object is determined to be a spectator. The switching between display and non-display of the privacy mask according to the resolution of spectators (size of spectators) is not limited to this method and may be performed based on a determination result of a face detection algorithm, a subject detection algorithm, or the like. In this case, the privacy mask may be displayed in a case where the area of a region detected as a face or an object makes up a predetermined proportion or more of the virtual viewpoint image. As described above, the first method is an example of determination based on information obtained within a single frame.

Figure 6:
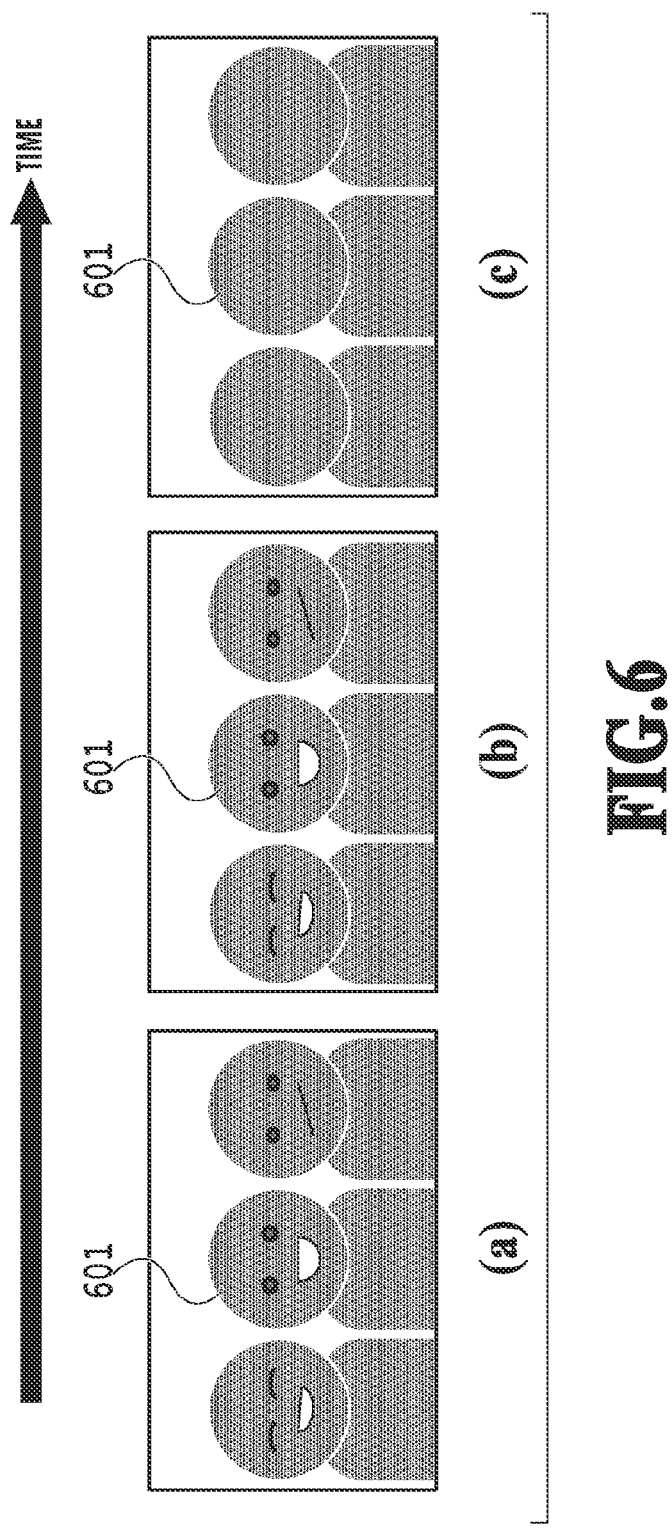
FIG. 6 is a diagram illustrating a method of switching between display and non-display of the privacy mask.

FIG. 6 is a diagram illustrating a second method. The second method is a method of switching between display and non-display of the privacy mask according to a time during which an object is observed. FIG. 6 is hereinafter used to describe the method of switching between display and non-display of the privacy mask in a case where spectators are displayed for a certain time or more in an image seen from the virtual viewpoint. FIG. 6 is a conceptual drawing showing the situation where the same spectators 601 seen from the virtual viewpoint are displayed continuously with the lapse of time. The spectators 601 are displayed without the privacy mask until the time of (b) in FIG. 6 a little later than the time of (a) in FIG. 6. On the other hand, in a case where the time during which the spectators 601 are displayed is equal to or greater than a certain time, the privacy mask is displayed on the spectators 601 as shown in FIG. 6 (*c*). Differently from the first method which determines whether or not to display the privacy mask within a single frame, the second method makes a determination based on whether the spectators are displayed in a plurality of frames prior to a certain frame. In other words, the second method is an example of determination based on information obtained from a plurality of temporally-continuous frames. Whether an image seen from the virtual viewpoint shows a spectator may be determined based on whether only the spectator is shown without showing a player or based on a time during which the spectator is shown using a face detection algorithm, a person tracking algorithm, or the like.

The two examples of the method of switching between display and non-display of the privacy mask have been described above. However, the method is not limited to these examples and may be based on, for instance, the speed or amount of movement of the virtual viewpoint. This is because privacy protection also needs to be enhanced in a case where the speed of movement of the virtual viewpoint is less than a predetermined speed or the amount of movement of the virtual viewpoint is less than a predetermined threshold. That is, the method of determining display or non-display of the privacy mask may be any method as long as it is based on a parameter indicating the virtual viewpoint. Further, although the privacy mask is switched based on a single determination criterion in the present embodiment, the privacy mask may be displayed based on results of a plurality of determination methods. More specifically, the privacy mask may be displayed in a case where it is determined that the virtual camera captures a high resolution image of spectators while moving slowly or standing still.

Description of Control of Display/Non-Display of Privacy Mask

Figure 7:
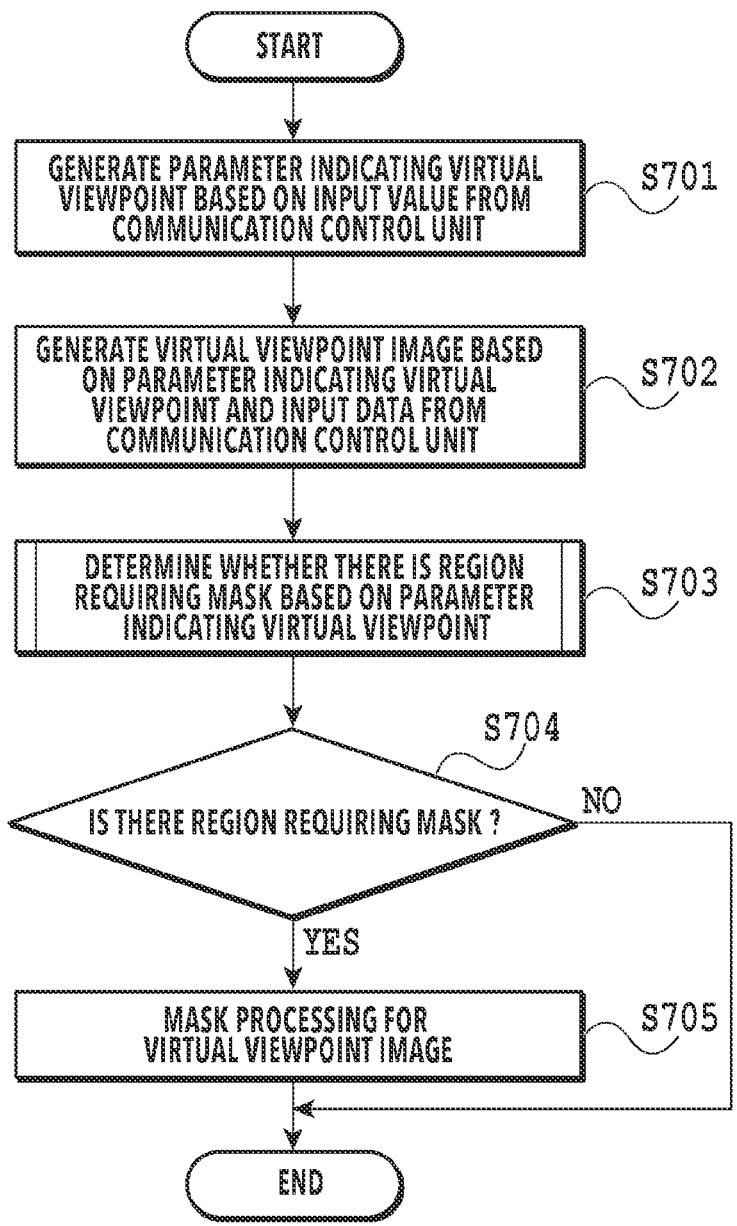
FIG. 7 is a flowchart showing an example of image processing.

FIG. 7 is a flowchart showing an example of image processing according to the present embodiment. FIG. 7 shows the flow of control of switching between display and non-display of the privacy mask. The flow shown in FIG. 7 is implemented by loading a control program stored in the ROM 113 in the image processing apparatus 102 into the RAM 112 and executing it by the CPU 111. Alternatively, some or all of the functions of the steps in FIG. 7 may be implemented by hardware such as an ASIC or an electronic circuit. The symbol "S" in the description of the processing means a step in the flowchart. The processing of FIG. 7 is triggered by the image processing apparatus 102 receiving the amounts of operation of the virtual viewpoint from the information processing apparatus 103 and the captured images of the cameras from the imaging system 101 and the communication control unit 301 outputting the received information to the virtual viewpoint control unit 302.

In S701, the virtual viewpoint control unit 302 generates a parameter indicating the virtual viewpoint based on the input value from the communication control unit 301. The generated parameter is output to the hidden region determination unit 303 and the virtual viewpoint image generating unit 304.

In S702, the virtual viewpoint image generating unit 304 generates a virtual viewpoint image based on the parameter indicating the virtual viewpoint input from the virtual viewpoint control unit 302 and captured image data input from the communication control unit 301. At the time of generation of a virtual viewpoint image, rendering processing is performed after the foreground, which is a main subject (object), is separated from the background and modeled. The foreground is modeled using foreground mask information corresponding to the silhouettes of the foreground seen from the cameras and foreground texture information (e.g., RGB color information on each pixel of the foreground). The foreground is modeled by performing three-dimensional shape estimation processing for each object present in a captured scene using foreground masks and foreground textures of the viewpoints. As the estimation method, it is only necessary to use a publicly-known method such as a visual-hull method using outline information on an object or a multi-view stereo method using triangulation. In this manner, data indicating a three-dimensional shape of the object (such as polygon data or voxel data) is generated. After that, the virtual viewpoint image generating unit 304 generates a virtual viewpoint image according to the parameter indicating the virtual viewpoint. The virtual viewpoint image can be generated by generating an image seen from the virtual viewpoint by a computer graphics technique using the three-dimensional shape data on the object obtained through the shape estimation processing. The generation processing has only to be performed using a publicly-known technique as appropriate.

In S703, the hidden region determination unit 303 determines whether to display the privacy mask based on the parameter indicating the virtual viewpoint input from the virtual viewpoint control unit 302. In the case of displaying the privacy mask, a region in which the privacy mask is displayed is output to the virtual viewpoint image generating unit 304. The processing in S703 will be described later in detail.

In S704, the virtual viewpoint image generating unit 304 determines whether there is a region that requires a mask. That is, the virtual viewpoint image generating unit 304 causes the processing to branch depending on the result of determination in S703. More specifically, the processing proceeds to S705 if the display of the privacy mask is determined in S703 and the flow is finished if the non-display is determined.

In S705, the hiding processing unit 305 receives the virtual viewpoint image and the region requiring the privacy mask from the virtual viewpoint image generating unit 304 and performs masking processing to display the privacy mask in the virtual viewpoint image. After that, the hiding processing unit 305 outputs the virtual viewpoint image that has been subjected to the masking processing to the virtual viewpoint image generating unit 304 and finishes the flow. After the end of the flow, the generated virtual viewpoint image is transmitted from the virtual viewpoint image generating unit 304 to the information processing apparatus 103 via the communication control unit 301.

Description of Control of Determination of Display/Non-Display of Privacy Mask

Figure 8:
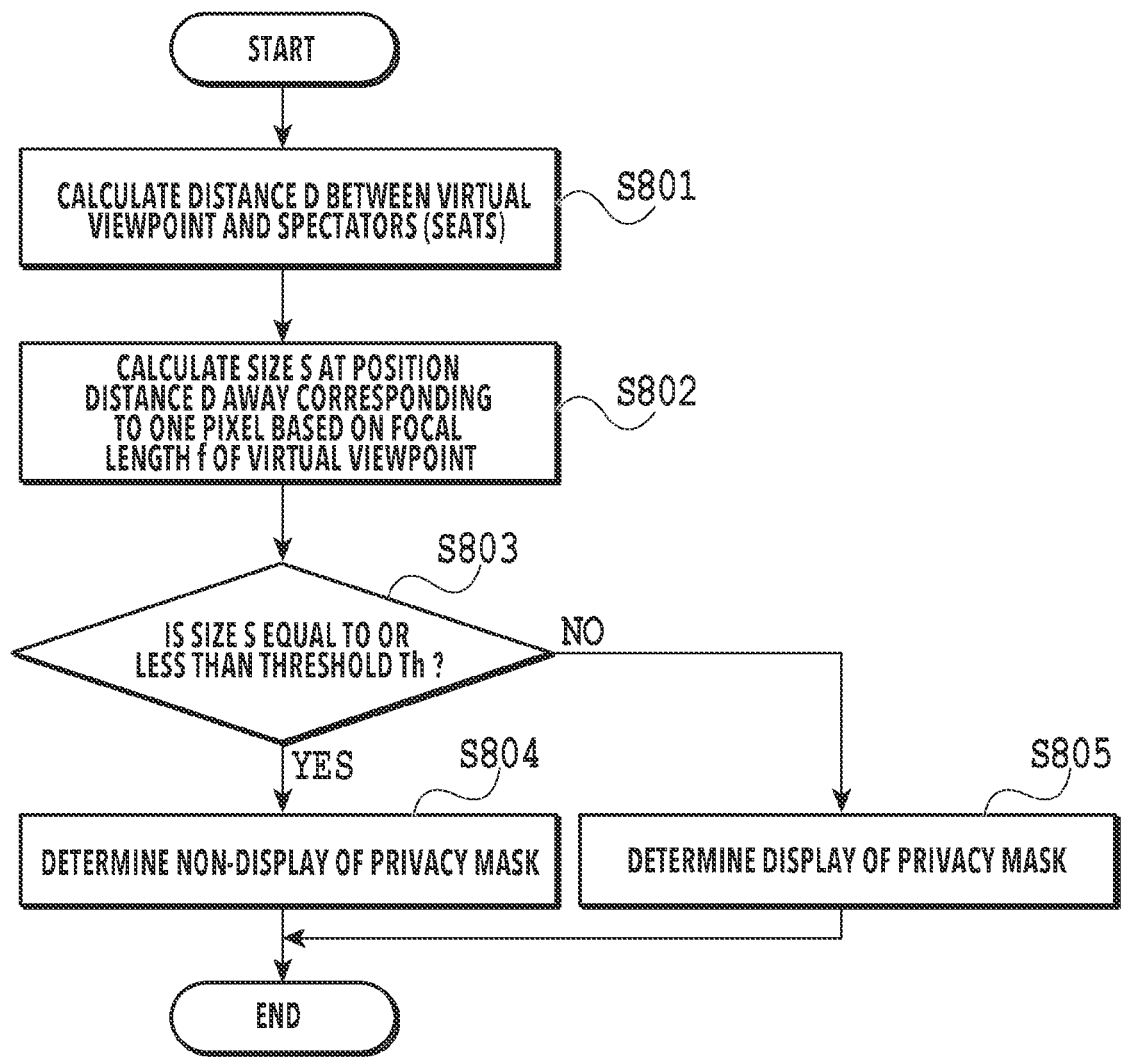
FIG. 8 is an example of a flowchart showing the flow of privacy mask determination processing.

FIG. 8 is an example of a flowchart showing the flow of determination processing of display or non-display of the privacy mask in S703 of FIG. 7. The processing of FIG. 8 is performed by the hidden region determination unit 303. Here, the display/non-display of the privacy mask is determined based on the resolution of spectators in the virtual viewpoint image seen from the virtual viewpoint as described with reference to FIG. 5. That is, in a case where spectators are shown at a certain resolution or more in the virtual viewpoint image seen from the virtual viewpoint, the determination result is changed from non-display of the privacy mask to display thereof. The flow of the FIG. 8 is triggered by input of the parameter indicating the virtual viewpoint from the virtual viewpoint control unit 302 and input of the 3D model or position information of spectators obtained from the virtual viewpoint image generating unit 304. It is assumed that a spectator and a player are distinguished based on whether an object is positioned inside or outside the field.

In S801, the hidden region determination unit 303 calculates a distance D between the virtual viewpoint and spectators (seats) based on the parameter indicating the virtual viewpoint and the 3D model or position information of the spectators.

In S802, based on the focal length f of the virtual viewpoint, the hidden region determination unit 303 calculates a size S at a position the distance D away corresponding to each pixel of the virtual viewpoint image.

In S803, the hidden region determination unit 303 causes the processing to branch based on a predetermined threshold Th. More specifically, the processing proceeds to S804 to determine non-display of the privacy mask if the size S is equal to or less than the threshold Th and proceeds to S805 to determine display of the privacy mask if the size S is greater than the threshold Th.

The processing from S801 to S805 is performed for each pixel of the virtual viewpoint image to determine a region in which the privacy mask is to be displayed. The hidden region determination unit 303 then transmits the region in which the privacy mask is to be displayed (hidden region) to the virtual viewpoint image generating unit 304.

As described above, in the present embodiment, masking processing is performed for an object seen in the virtual viewpoint image in a case where a predetermined determination condition of the privacy mask is satisfied based on the parameter indicating the virtual viewpoint. The parameter indicating the virtual viewpoint can be arbitrarily changed by user operation by a user watching the virtual viewpoint image. Thus, in a case where the user operation is such operation that privacy cannot be appropriately protected, masking processing is performed for privacy protection. In a case where the user operation is such operation that privacy can be appropriately protected, masking processing is not performed. As a result, privacy of the subject (object) can be protected while suppressing a reduction in realism of the virtual viewpoint image.

Second Embodiment

In the first embodiment, an example of performing processing to switch between display and non-display of the privacy mask based on the parameter indicating the virtual viewpoint has been described. In the present embodiment, a description will be given of an example in which the aspect of display of the privacy mask is different from that in the first embodiment. In the present embodiment, the method of displaying the privacy mask is gradually changed according to the operation of the virtual viewpoint by a user under a circumstance where it is determined that the privacy mask is displayed. It should be noted that the description of commonalities with the first embodiment such as the hardware and software configurations of the image processing apparatus will be omitted or simplified and a description will be mainly given of control for determining the method of displaying the privacy mask.

Figure 9:
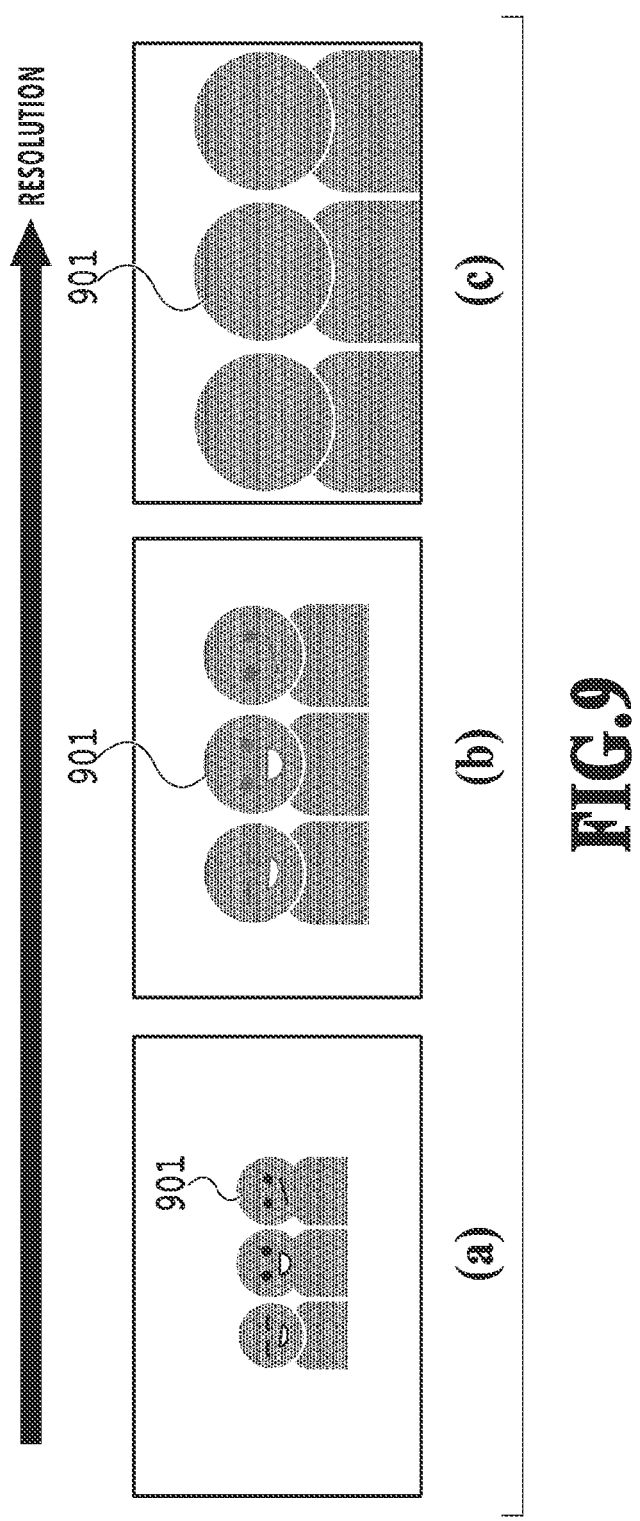
FIG. 9 is a diagram showing an example of a method of gradually changing a method of displaying the privacy mask.
Figure 10:
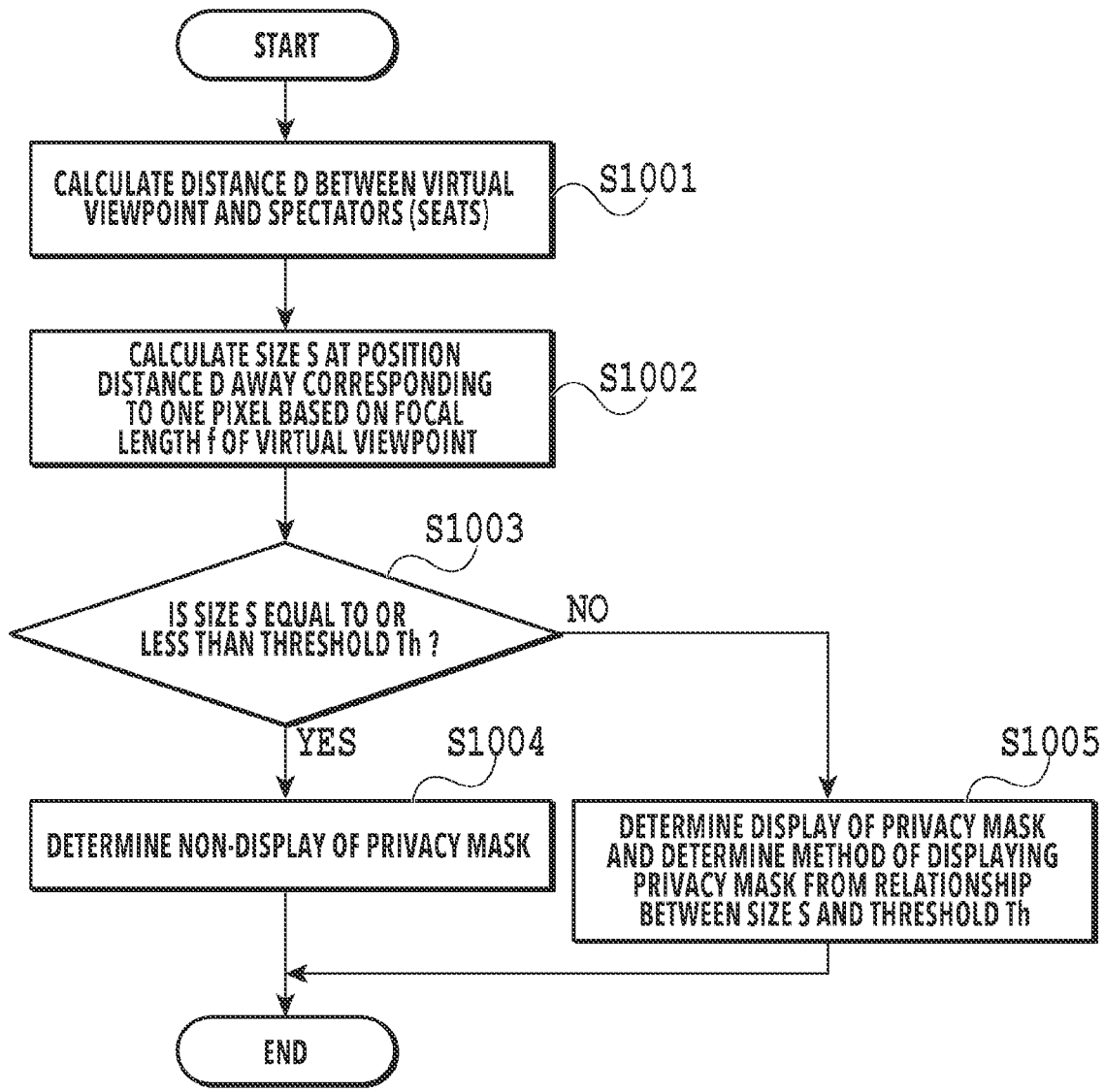
FIG. 10 is a flowchart showing the flow of privacy mask determination processing.

FIG. 9 is a diagram showing an example of a method of gradually changing the method of displaying the privacy mask depending on the parameter indicating the virtual viewpoint according to the present embodiment. FIG. 10 is a flowchart showing the flow of privacy mask determination processing according to the present embodiment.

Spectators 901 in FIG. 9 correspond to the spectators 501 in FIG. 5. Like FIG. 5, FIG. 9 shows an example in which the virtual viewpoint becomes close to the spectators 901 from (a) to (c) in FIG. 9. However, differently from FIG. 5, the privacy mask is also displayed on the spectators 901 at the stage before the faces of the spectators 901 become indistinguishable as shown in FIG. 9 (b). In FIG. 9 (b), masking processing is performed to fade the faces of the spectators 901, with the result that the faces of the spectators 901 are hard to distinguish. In FIG. 9 (c), the masking processing is proceeded to the extent that the faces of the spectators 901 cannot be distinguished. In short, in this example, the method of displaying the privacy mask is gradually changed as the virtual viewpoint becomes close to the spectators.

The flow of FIG. 10 shows the details of the processing in S703 of FIG. 7 described in the first embodiment, which is executed by the hidden region determination unit 303. The flow of FIG. 10 is triggered by input of the parameter indicating the virtual viewpoint from the virtual viewpoint control unit 302 and input of the 3D model or position information of the spectators obtained from the virtual viewpoint image generating unit 304.

Since S1001 to S1004 are the same as S801 to S804 in the flow of FIG. 8 of the first embodiment, the description thereof is omitted.

In the present embodiment, if it is determined in S1003 that the size S is not equal to or less than the threshold Th, the processing proceeds to S1005. In S1005, the hidden region determination unit 303 determines the method of displaying the privacy mask from the relationship between the threshold Th and the size S at the position the distance D away corresponding to one pixel calculated from the distance D between the virtual viewpoint and the spectators and the focal length f of the virtual viewpoint. For example, in a case where mosaic processing is performed for the privacy mask, the method of displaying is determined as follows. A mosaic level is low in a case where a difference between the size S and the threshold Th is small and the mosaic level is increased as the difference becomes larger. The determined mosaic level is transmitted to the hiding processing unit 305 via the virtual viewpoint image generating unit 304 and the hiding processing unit 305 performs mosaic processing according to the level. That is, in a case where the size S is not equal to or less than the threshold Th and the difference between the size S and the threshold Th is equal to a first value, the hiding processing unit 305 performs control such that the strength of the masking processing is less than that in a case where the difference is equal to a second value greater than the first value.

As described above, according to the present embodiment, the method of displaying the privacy mask is gradually changed according to user operation of the virtual viewpoint. This makes it possible to suppress conspicuousness of switching between display and non-display of the privacy mask. If the display and non-display of the privacy mask is switched frequently while the virtual viewpoint is operated, there is a possibility that the attention is focused on the privacy mask and the realism of the virtual viewpoint image is reduced. In the present embodiment, for example, the privacy mask is changed gradually even in a case where a user operates and designates the virtual viewpoint to stare at spectators without malice. Therefore, the conspicuousness of switching of the privacy mask can be suppressed.

Although the method of displaying the privacy mask is determined based on the resolution of spectators in an image seen from the virtual viewpoint in the present embodiment, the determination is not limited to this and may be made according to the various methods described in the first embodiment. For example, as described above with reference to FIG. 6, in a case where an image from the virtual viewpoint shows spectators for a certain time or more, the method of displaying the privacy mask may be changed according to the time during which the spectators are shown. According to the processing described above, even if a user mistakenly operates the virtual viewpoint such that privacy of a subject cannot be appropriately protected, switching between display and non-display of the privacy mask can be inconspicuous and a decrease in realism of the virtual viewpoint image can be suppressed.

Other Embodiments

In the embodiments described above, the hidden region determination unit 303, the virtual viewpoint image generating unit 304, and the hiding processing unit 305 are described as separate units. However, some or all of them may be integrated. For example, a hidden region can be determined and hiding processing can be performed for the hidden region at the stage of generation of a virtual viewpoint image. Thus, the virtual viewpoint image generating unit 304 may be configured to generate a virtual viewpoint image in which hiding processing has been performed for a hidden region.

In the embodiments described above, whether an object (subject) in the virtual viewpoint image is a spectator who should not be originally gazed at or a player who should be originally gazed at is distinguished using the 3D model or three-dimensional position information of spectators obtained from the virtual viewpoint image generating unit 304. However, the method of distinction is not limited to this and whether an object is a target of privacy protection may be distinguished by any method. For example, the image processing apparatus 102 may obtain scene information indicating a scene captured by the imaging system 101. In the example of the embodiments described above, information indicating a soccer game is obtained as the scene information. The image processing apparatus 102 also obtains information defining a target of privacy protection corresponding to each scene indicated by the scene information. The obtained information may be used to distinguish a target of privacy protection. That is, the scene information can be used to determine that the scene is a soccer game and the definition information can be further used to determine that a spectator is a target of privacy protection corresponding to the soccer game. After that, as described above, the image processing apparatus 102 may distinguish whether an object is the target of privacy protection using the 3D model or three-dimensional position information.

Further, although the soccer game is described above as an example of the scene, it may be a game of another sport such as rugby or baseball, or an event that attracts spectators such as a concert or play.

Further, in the embodiments described above, the object is obscured by displaying the privacy mask as an example. However, a mark indicating prohibition of display may be displayed as the privacy mask in order to call attention to a user. Further, in a case where the privacy mask is displayed, a notification which urges a user to move the virtual viewpoint may also be displayed.

Further, the hiding processing may be performed for various purposes other than privacy enhancement. For example, in sports such as baseball, it is considered that instructions (signs) from a manager or coach to players need to be hidden from persons not concerned with a team. The hiding processing may be performed for the purpose of suppressing clear display of such instructions in the virtual viewpoint image. The hiding processing can also suppress unintentional display of trade secret, confidential information, and the like in the virtual viewpoint image.

The hiding processing may be performed in response to a user's request. Further, the hiding processing may also be removed in response to a user's request. Further, as the hiding processing, a virtual object may be added to a region to be hidden. The virtual object may be, for example, an avatar or virtual advertisement. Further, a spectator attending an event to be recorded may request that a virtual object be displayed instead of himself/herself and the virtual object may be displayed in response to the request. Further, a virtual object selected from a plurality of candidate objects by the spectator may be displayed or a virtual object provided by the spectator may be displayed.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

According to the present disclosure, an appropriate virtual viewpoint image can be generated.

This application claims the benefit of Japanese Patent Application No. 2020-136320, filed Aug. 12, 2020, which is hereby incorporated by reference wherein in its entirety.

What is claimed is:

1. An image processing apparatus comprising:
one or more memories storing instructions; and
one or more processors executing the instructions to:
obtain virtual viewpoint information indicating at least a position of a virtual viewpoint and a view direction from the virtual viewpoint; and
generate a virtual viewpoint image based on the obtained virtual viewpoint information and a plurality of images captured from a plurality of viewpoints by hiding processing a specific region of the virtual viewpoint image, the specific region being determined based on that the obtained virtual viewpoint information satisfies a condition wherein
the virtual viewpoint image is a moving image including a plurality of frames, and
the condition is based on the virtual viewpoint information in a single frame and representing that a resolution of an object in the single frame is equal to or greater than a predetermined threshold.

2. The image processing apparatus according to claim 1, wherein
the condition comprises a plurality of conditions, and
the one or more processors further execute the instructions to determine that a region in which the virtual viewpoint information satisfies all of the plurality of conditions is the specific region.

3. The image processing apparatus according to claim 1, wherein
the one or more processors further execute the instructions to distinguish an object to be subjected to the hiding processing according to a position in a three-dimensional space.

4. The image processing apparatus according to claim 1, wherein
the hiding processing the specific region is performed by performing processing of obscuring the specific region.

5. The image processing apparatus according to claim 1, wherein
the hiding processing the specific region is performed by performing masking processing for the specific region.

6. The image processing apparatus according to claim 1, wherein
the one or more processors further execute the instructions to receive, from an external apparatus, the virtual viewpoint information determined according to an amount of operation of the virtual viewpoint by a user, and
the received virtual viewpoint information is obtained.

7. The image processing apparatus according to claim 1, wherein
the one or more processors further execute the instructions to:
receive an amount of operation of the virtual viewpoint by a user from an external apparatus, and
determine virtual viewpoint information according to the amount of operation, and
the determined virtual viewpoint information is obtained.

8. An image processing apparatus comprising:
one or more memories storing instructions; and
one or more processors executing the instructions to:
obtain virtual viewpoint information indicating at least a position of a virtual viewpoint and a view direction from the virtual viewpoint; and
generate a virtual viewpoint image based on the obtained virtual viewpoint information and a plurality of images captured from a plurality of viewpoints by hiding processing a specific region of the virtual viewpoint image, the specific region being determined based on that the obtained virtual viewpoint information satisfies a condition, wherein
the virtual viewpoint image is a moving image including a plurality of frames, and
the condition is based on the virtual viewpoint information in the plurality of frames.

9. The image processing apparatus according to claim 8, wherein
the condition is that a time during which an object is included in the plurality of frames is equal to or greater than a predetermined threshold.

10. The image processing apparatus according to claim 8, wherein
the condition is that an amount of movement of the virtual viewpoint in the plurality of frames is less than a predetermined threshold.

11. An image processing apparatus comprising:
one or more memories storing instructions; and
one or more processors executing the instructions to:
obtain virtual viewpoint information indicating at least a position of a virtual viewpoint and a view direction from the virtual viewpoint; and
generate a virtual viewpoint image based on the obtained virtual viewpoint information and a plurality of images captured from a plurality of viewpoints by hiding processing a specific region of the virtual viewpoint image, the specific region being determined based on that the obtained virtual viewpoint information satisfies a condition, wherein
the hiding processing the specific region is performed by masking processing gradually for the specific region in a case where the virtual viewpoint information satisfies the condition.

12. The image processing apparatus according to claim 11, wherein
in a case where a difference between the virtual viewpoint information and a threshold included in the condition is equal to a first value, strength of the masking processing is reduced as compared with a case where the difference between the virtual viewpoint information and the threshold included in the condition is equal to a second value greater than the first value.

13. An image processing method comprising:
obtaining virtual viewpoint information indicating at least a position of a virtual viewpoint and a view direction from the virtual viewpoint; and
generating a virtual viewpoint image based on the obtained virtual viewpoint information and a plurality of images captured from a plurality of viewpoints by hiding processing a specific region of the virtual viewpoint image, the specific region being determined based on that the obtained virtual viewpoint information satisfies a condition, wherein
the virtual viewpoint image is a moving image including a plurality of frames, and
the condition is based on the virtual viewpoint information in a single frame and representing that a resolution of an object in the single frame is equal to or greater than a predetermined threshold.

14. A non-transitory computer readable storage medium storing a program which causes a computer to perform:
obtaining virtual viewpoint information indicating at least a position of a virtual viewpoint and a view direction from the virtual viewpoint; and
generating a virtual viewpoint image based on the obtained virtual viewpoint information and a plurality of images captured from a plurality of viewpoints by hiding processing a specific region of the virtual viewpoint image the specific region being determined based on that the obtained virtual viewpoint information satisfies a condition, wherein
the virtual viewpoint image is a moving image including a plurality of frames, and
the condition is based on the virtual viewpoint information in a single frame and representing that a resolution of an object in the single frame is equal to or greater than a predetermined threshold.

* * * * *